(No Model.) 2 Sheets—Sheet 1.

A. C. PRENTICE & C. M. FULLER.
POTATO DIGGER.

No. 456,430. Patented July 21, 1891.

WITNESSES:
Chas. Nida
C. Sedgwick

INVENTOR:
A. C. Prentice
C. M. Fuller
BY
Munn & Co.
ATTORNEYS (No Model.) 2 Sheets—Sheet 2.

A. C. PRENTICE & C. M. FULLER.
POTATO DIGGER.

No. 456,430. Patented July 21, 1891.

WITNESSES:
Chas. Nida
C. Sedgwick

INVENTOR:
A. C. Prentice
C. M. Fuller
BY Munn & Co.
ATTORNEYS

UNITED STATES PATENT OFFICE.

ADELBERT CYRUS PRENTICE AND CHARLES MASON FULLER, OF SOUTH BYRON, NEW YORK.

POTATO-DIGGER.

SPECIFICATION forming part of Letters Patent No. 456,430, dated July 21, 1891.

Application filed September 27, 1890. Serial No. 366,322. (No model.)

*To all whom it may concern:*

Be it known that we, ADELBERT CYRUS PRENTICE and CHARLES MASON FULLER, both of South Byron, in the county of Genesee and State of New York, have invented a new and useful Potato-Digger, of which the following is a full, clear, and exact description.

Our invention relates to an improvement in potato-diggers, and has for its object to provide an implement of simple, durable, and economic construction, and capable of delivering the potatoes at either side, as may be found desirable, thus permitting row after row to be dug, and not each alternate row, as has been heretofore the practice.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
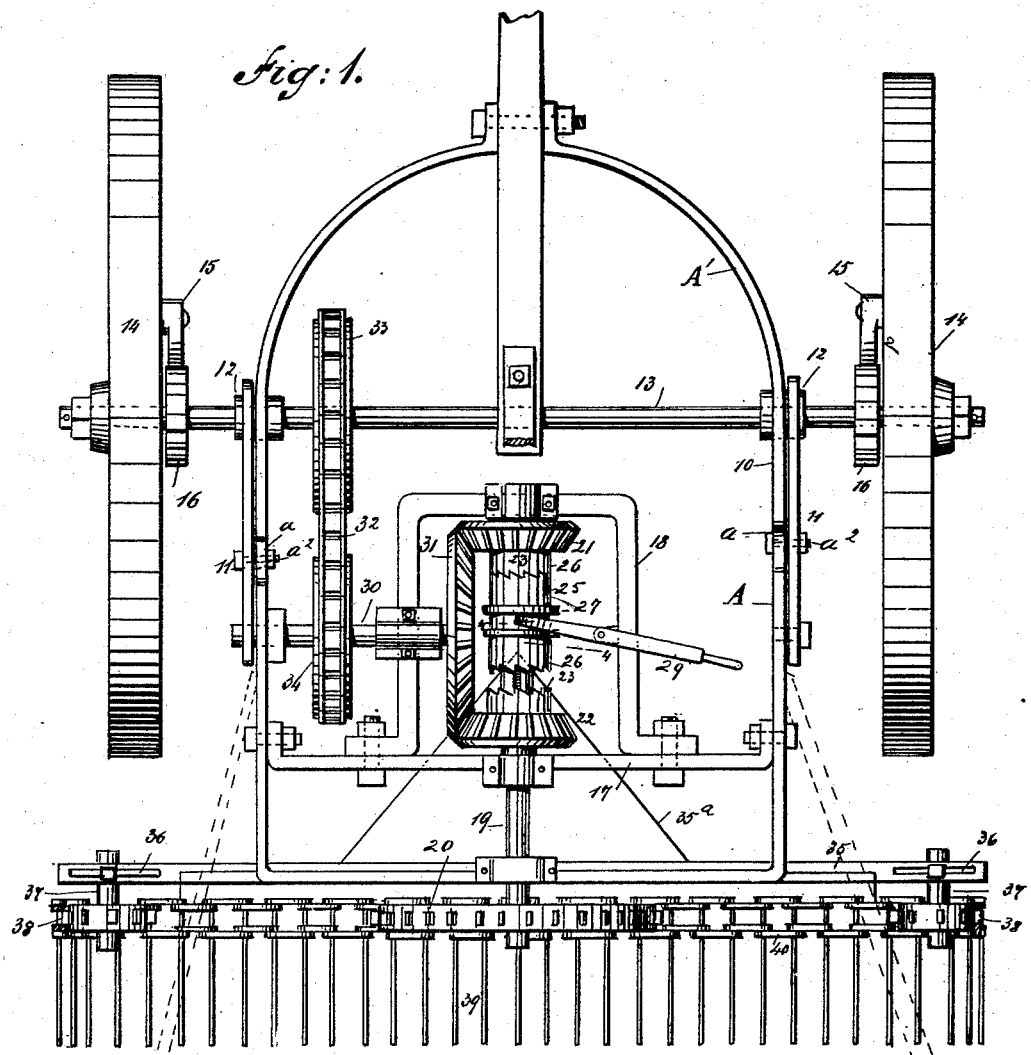
Figures 2, 3, 4:
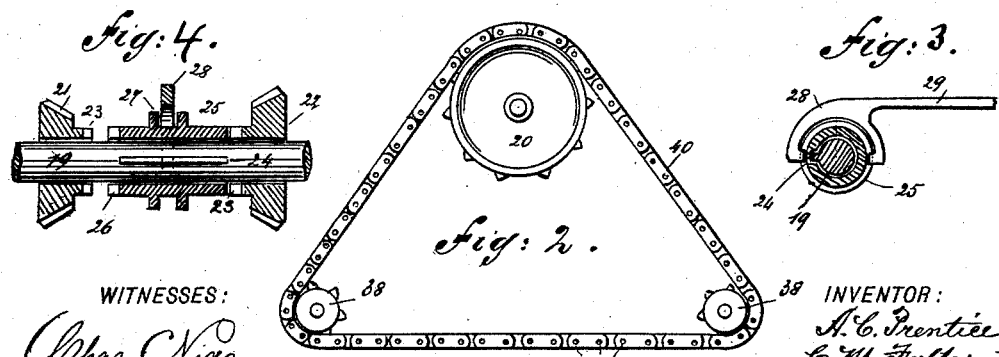
Figure 5:
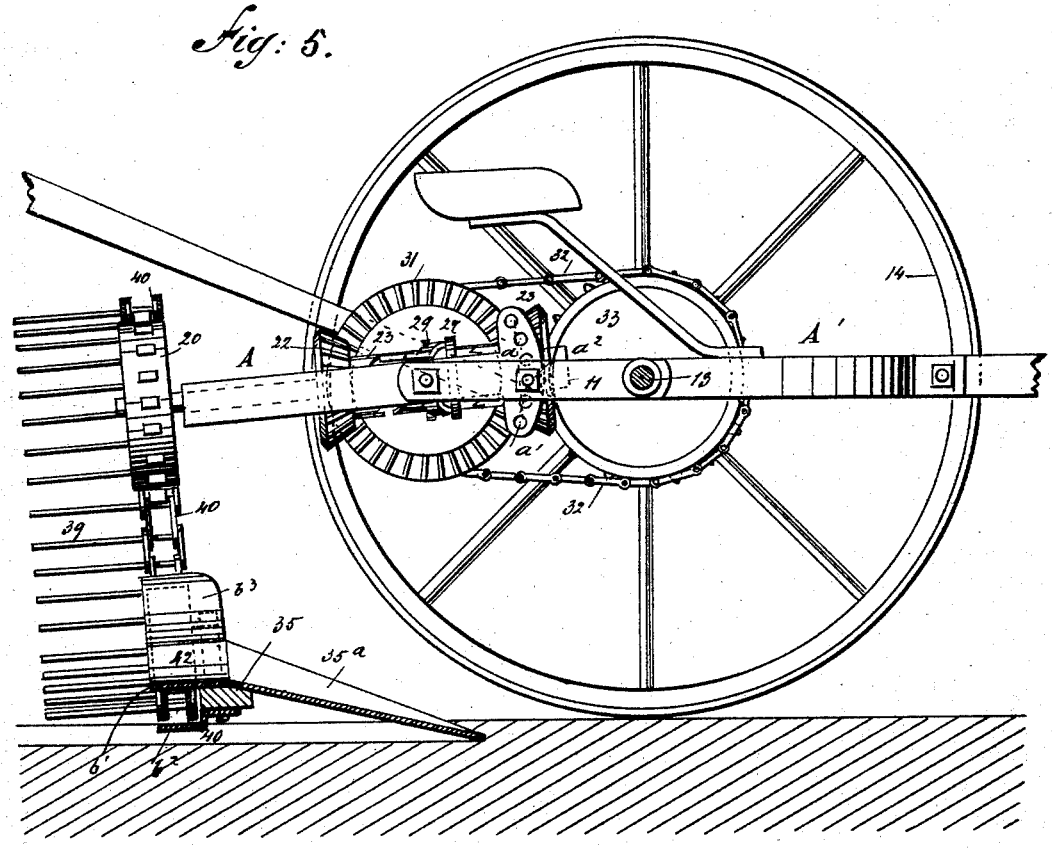
Figure 6:
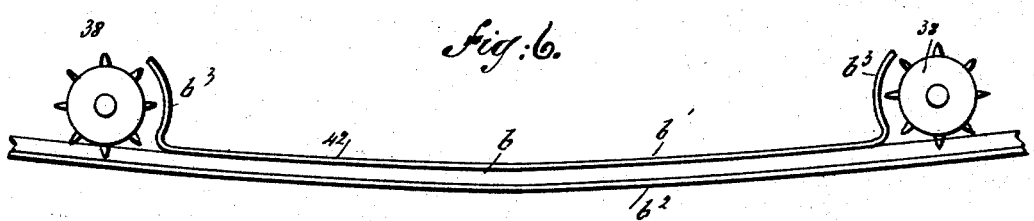

Figure 1 is a plan view of the implement with the upper portion of the carrying-belt removed. Fig. 2 is a rear elevation of the carrying-belt, illustrating the position of the wheels over which said belt runs. Fig. 3 is a section on line 4 4 of Fig. 1. Fig. 4 is a longitudinal vertical section of the clutch mechanism. Fig. 5 is a side elevation of the body of the implement and a central vertical section through the digger, and Fig. 6 is a rear view of the digger-guard detached.

The frame 10 is preferably made in two sections A and A', the front section being hinged to the rear section, whereby one may be folded over upon the other or the rear section elevated or depressed. To each side of the rear section an adjusting-lever 11 is attached, and both adjusting-levers have boxes 12, formed at their forward ends, in which boxes the axle 13 is journaled and the forward section is also secured to the boxes. The forward ends of the rear section of the frame terminate in a vertical head $a$, having a semicircular forward edge, and provided with a series of semicircularly-arranged apertures $a'$. The rear ends of the levers 11 are pivoted in any approved manner to the sides of the rear section, and the said section is held horizontally or in any desired upper or lower position by bolts $a^2$, passed through the levers and one of the apertures in the frame heads $a$.

Upon the extremities of the axle outside of the frame the drive-wheels 14 are journaled, and each drive-wheel upon its inner face is provided with a dog 15, the said dogs being adapted for engagement with the ratchet-wheels 16, fast to the shaft, one near the inner face of each drive-wheel, and the dogs 15 so engage with the ratchet-wheels 16 that when the implement is drawn forward the dogs will force the ratchet-wheels to revolve; but when the implement is moved backward the dogs slide over the ratchets.

Near the rear of the frame 10 a cross-bar 17 is located, and to the said cross-bar an inner forwardly-extending and horizontal yoke-frame 18 is attached. In suitable boxes located upon the rear end of the frame 10 the cross-bar 17 and the forward end of the inner yoke-frame 18 a shaft 19 is journaled, the rear end of which shaft extends beyond the rear of the main frame, and has secured thereto a sprocket-wheel 20.

Within the yoke-frame 18 two beveled pinions 21 and 22 are loosely mounted upon the shaft 18, the opposed faces of the hubs of said pinions being shaped to form notches 23, and upon the shaft 19, between the pinions 21 and 22, feathers 24 are formed, as best illustrated in Fig. 5, and a sleeve 25, provided with internal grooves to receive the feathers, is held to slide upon the shaft 19. Each end of the sleeve 25 is provided with a clutch-face 26, and at each side of the center of the sleeve upon its periphery annular ribs 27 are produced. The surface of the sleeve between the ribs is engaged by the bifurcated end 28 of a shifting lever 29, which lever is fulcrumed upon one side piece of the inner yoke-frame 18, and the members at the bifurcated end of the lever 29 are preferably inwardly bent to engage the ribs formed in the sleeve.

In suitable boxes upon the opposite side of the yoke-frame 18 and the contiguous side of the main frame a transverse shaft 30 is journaled. Upon the inner end of this transverse shaft a bevel-gear 31 is secured, which meshes with the pinions 21 and 22, and when the shaft 30 is revolved movement is thereby communicated to the shaft 19. The shaft 30 is revolved by means of a chain belt 32, which passes over a sprocket-wheel 33, fast upon the axle 13, and a sprocket-wheel 34, secured to the shaft 30, as is best shown in Fig. 1.

From each corner of the rear of the main frame 10 hangers of any approved construction are projected downward and are attached to a transverse beam 35, supporting said beam in a horizontal position, the beam being of sufficient length to project some distance beyond the sides of the main frame. To this beam 35 the share or shares $35^a$, employed for digging the potatoes, are attached. At the extremities of the beam longitudinal slots 36 are formed, and below said slots shafts 37 are located, the said shafts being laterally adjustable, and each of the shafts 37 is provided with a sprocket-wheel 38, held to revolve thereon, which sprocket-wheels are much smaller than the upper sprocket-wheel 20. An endless carrying chain belt 40 is rotated by the sprocket-wheels 20 and 38, and the said chain belt is provided with a series of fingers 39, horizontally located and projected rearward at suitable intervals from the outer side faces of the links of the belt, as shown in Fig. 1, the plane of the lower section of the belt being essentially that of the upper face of the beam 35.

A guide-shield 42 is secured in any approved manner to the beam 35 or adjacent support, consisting, essentially, of a vertical member $b$, having an integral horizontal member $b^2$, the vertical member being provided with a flange adapted for engagement with the rear face of the beam 35, the horizontal member $b^2$ extending rearward from the beam. The remaining member $b'$ of the shield is a horizontal one, and is attached to the upper face of the beam 35 and extends outward therefrom a greater portion of its length parallel with the lower member $b^2$. The upper member $b'$, however, at its extremities, is curved upward and outward to form shields $b^3$ for the lower sprocket-wheels 38. An endless-chain belt passes between the members $b'$ and $b^2$ of the guide-shield, and the share $35^a$ at its rear end is preferably made to abut against the forward edge of the upper member of the shield.

The object of providing the shifting sleeve 25 is to impart movement to the chain belts to deliver the potatoes at either side of the machine, as may be found desirable, and this is accomplished by throwing the said sleeve in mesh with the clutch-sections of either one or the other of the bevel-gears 21 and 22. As the potatoes are dug they pass up the shares and over the fingers of the chain belt, the dirt falling down through the spaces between the fingers, while the potatoes are carried over to the right or to the left and delivered out of the path of the drive-wheels.

Having thus described our invention, we claim as new and desire to secure by Letters Patent—

1. The combination, with the frame and the driving mechanism, of a transversely-extending shovel and a transverse endless belt having a series of rearward-projecting fingers, the said shovel discharging upon the fingers of the lower horizontal half of the belt, substantially as set forth.

2. The combination, with the drive-wheels and the axle, of the front frame-section mounted on said axle, the levers 11 11, mounted at their front ends on the axle, the rear frame-section having heads $a'$ at its forward ends and pivoted in rear thereof to the rear ends of the said levers to swing vertically, and adjusting bolts or pins connecting said levers between their ends with any of the apertures in said heads, and the digging mechanism carried by the said rear frame-section, substantially as set forth.

3. In a machine of the character described, the combination, with a frame and sprocket-wheels triangularly arranged upon the frame, of an endless delivery chain belt carried by the said sprocket-wheels and provided with horizontally-projecting spaced fingers, and a shifting device connected with the shaft of the driving sprocket-wheel, whereby the chain may be revolved in the direction of either side of the frame, as desired.

4. In a machine of the character described, the combination, with the frame thereof, the axle, the drive-wheels mounted upon the axle, a ratchet connection between the drive-wheels and the axle, and adjusting-levers connected with the axle and the frame, of a longitudinal shaft, a driving sprocket-wheel secured to the said shaft, and lower sprocket-wheels triangularly arranged with respect to the driving sprocket-wheel, an endless-chain delivery-belt carried by the sprocket-wheels and provided with a series of spaced horizontally-projecting fingers, a driving connection between the axle and the shaft of the driving sprocket-wheel, and a shifting mechanism connected with the shaft, as and for the purpose specified.

ADELBERT CYRUS PRENTICE.
CHARLES MASON FULLER.

Witnesses for Adelbert Cyrus Prentice:
ROBT. STEWART,
H. G. MARCH.

Witnesses for Charles Mason Fuller:
GEO. W. PRENTICE,
J. FRED. ACKER.